United States Patent [19]
Mieda et al.

[11] Patent Number: 5,331,625
[45] Date of Patent: Jul. 19, 1994

[54] OPTICAL DISC WITH ANTISTATIC COATING CONTAINING TIN OXIDE AND PHOSPHOROUS

[75] Inventors: Michinobu Mieda, Shigi; Toshikazu Nagaura; Hirotoshi Takemori, both of Nara; Kenji Ohta, Kitakatsuragi; Hiroo Yoshidome, Kitakyushu, all of Japan

[73] Assignee: Sharp Kabushiki Kaisha, Osaka, Japan

[21] Appl. No.: 946,934

[22] Filed: Sep. 17, 1992

[30] Foreign Application Priority Data

Sep. 19, 1991 [JP] Japan .................................. 3-239971

[51] Int. Cl.$^5$ ............................ G02F 1/01; G11B 7/26
[52] U.S. Cl. ................................ 369/275.1; 369/283; 369/291; 430/271; 430/275; 430/945
[58] Field of Search ............... 430/271, 276, 275, 495, 430/945; 369/283, 275.5, 275.1, 291; 428/900

[56] References Cited

U.S. PATENT DOCUMENTS

| | | | |
|---|---|---|---|
| 4,514,322 | 4/1985 | Swoboda | 252/518 |
| 5,202,220 | 4/1993 | Park et al. | 430/276 |
| 5,226,035 | 7/1993 | Kato et al. | 369/291 |

FOREIGN PATENT DOCUMENTS

| | | |
|---|---|---|
| 60-239946 | 11/1985 | Japan . |
| 64-14267 | 1/1989 | Japan . |
| 1-119934 | 5/1989 | Japan . |
| 1-158643 | 6/1989 | Japan . |
| 3108138 | 5/1991 | Japan . |
| 3176832 | 7/1991 | Japan . |
| 3203050 | 9/1991 | Japan . |
| 4149837 | 5/1992 | Japan . |
| 04172634 | 6/1992 | Japan . |
| 4212734 | 8/1992 | Japan . |

Primary Examiner—Paul M. Dzierzynski
Assistant Examiner—Kim-Kwok Chu
Attorney, Agent, or Firm—David G. Conlin; George W. Neuner

[57] ABSTRACT

An optical disc comprises an antistatic film of light transmission properties which is formed of a synthetic resin, includes a tin oxide with a phosphorous as electro-conductive filler and is provided on another side of a plastics substrate of the optical disc where an optical beam is applied.

5 Claims, 5 Drawing Sheets

OPTICAL DISC WITH ANTISTATIC COATING CONTAINING TIN OXIDE AND PHOSPHOROUS

BACKGROUND OF THE INVENTION

1. Field of the Invention

The present invention relates to an optical disc for recording, erasing or reproducing information using a laser beam and more particularly, to a protective coat for a substrate of optical disc which is made of plastics.

2. Description of the Related Art

As a substrate of an optical disc, a thermoplastic resin such as PC (polycarbonate) or PMMA (poly methylmethacrylate) is widely used. Since such plastics substrate is a dielectric, static electricity is likely to be electrically charged, so that dust or the like is easily attached onto the substrate surface, causing a laser beam to scatter. Therefore, recording and reproducing are not normally performed. In order to solve such problem, there is provided a transparent antistatic resin film on the side of the substrate where the optical beam is applied, which is disclosed in Japanese Patent Publication No. 158643/1989.

As the transparent antistatic resin film, there have been known an antistatic resin film mixed with a surface active agent, a siloxane, an inorganic transparent electro-conductive compound, an electro-conductive filler or the like.

As for the antistatic resin film mixed with a surface active agent, as a ratio of the surface-active agent to the resin is increased, an antistatic effect is heighten but surface hardness is lowered. Contrarily, as that ratio is decreased, the surface hardness is improved but the anti-static effect is lowered, which means that the antistatic effect and the surface hardness can not be satisfied at the same time. In addition, when it is exposed to condition of the high temperature and humidity, for example at 80° C. and 90%RH, the surface-active agent comes out on the surface of the film and then water is attached to that surface-active agent so that a waterdrop is generated, which is a problem in respect of long-term stability.

As for the antistatic resin film mixed with a siloxane, although the antistatic effect is high and the film is hard itself, since its film thickness can not be thick, that is, below 0.2 µm, the sufficient surface hardness can not be obtained on a soft plastics substrate. When the optical disc comprising the antistatic resin film mixed with the siloxane is put to a low temperature and high temperature cycle test, a surface crack could be generated because adhesive property between the film and the substrate is not good. When it is exposed to the condition of high temperature, for example 80° C., the antistatic effect is considerably lowered and the long-term stability is not enough.

In addition, as for the antistatic resin film mixed with an inorganic transparent electro-conductive compound such as ITO ($In_2O_3$: Sn) or tin oxide ($SnO_2$), the adhesive property with the plastics substrate is poor and the film thickness is thin, so that the sufficient surface hardness can not be obtained.

As for the antistatic resin film mixed with an electro-conductive filler, it is known that the antistatic effect is high. However, in the antistatic resin film mixed with the electro-conductive filler, stability and light transmission properties can not be satisfied at the same time. More specifically, when the electro-conductive filler comprises only tin oxide, stability, shelf life and reproducibility need to be improved. When tin oxide doped with antimony has preferable stability but low light transmission properties. In addition, since the surface of the antistatic resin film mixed with the electro-conductive filler is not flat surface, when it is used in the optical disc substrate, incident beam is scattered, causing the light transmission properties to be lowered and recording and reproducing signals to deteriorate.

SUMMARY OF THE INVENTION

The present invention provides an optical disc comprising an antistatic film of light transmission properties which is formed of a synthetic resin, includes a tin oxide with a phosphorous as electro-conductive filler and is provided on another side of a plastics substrate of the optical disc where an optical beam is applied. A doping amount of phosphorous into the tin oxide in the electro-conductive filler is preferably 3 to 7 wt %. The content of the electro-conductive filler in the antistatic film is preferably 25 to 45 wt % and/or an average particle diameter thereof is preferably 0.15 µm or less.

DETAILED DESCRIPTION OF THE INVENTION

Figure 1:
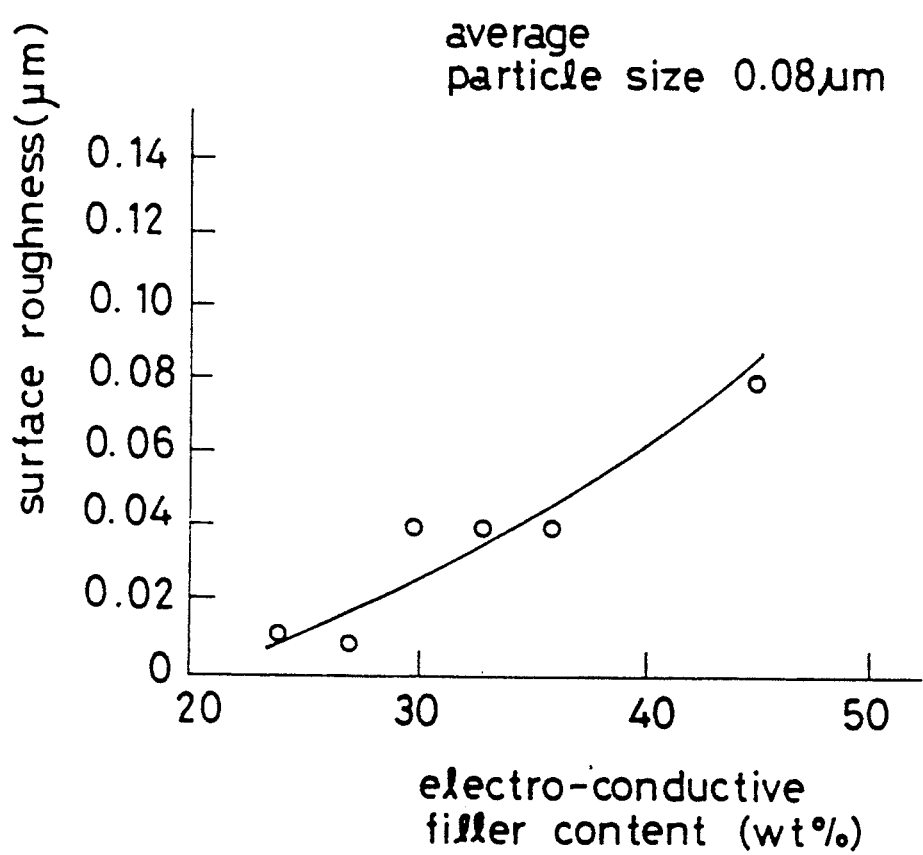
FIG. 1 is a graph showing a relation between the content of a electro-conductive filler to be employed in the invention and a surface flatness.

The present invention provides an optical disc using plastics substrate which is covered by comprising an antistatic resin film mixed an electro-conductive filler in which stability and light transmission properties are high, surface is flat and antistatic function is effective.

The plastics substrate may be formed of a material which has light transmission properties and is not likely to be deformed. Typically, a polycarbonate is used. Besides, an acrylic resin, an epoxy resin or the like may be used for the substrate. In addition, a thickness of the substrate is normally 1.15 to 1.25 mm.

The optical disc according to the present invention has a recording film and a protective film for protecting the recording film on at least one side of the plastics substrate. In addition, the antistatic film is provided on the other side (where the optical beam is applied) of the plastics substrate normally through a film for preventing moisture transmission.

The optical disc according to the present invention is not limited to the above, and it may be any one of a photomagnetic disc, a compact disc, a write once type disc, a photochromic type disc which are all well known.

In any case, a specific antistatic resin film has to be provided on the substrate on the side where the optical beam is applied.

The recording film, the protective film, the film for preventing moisture transmission, and the antistatic resin film used in the optical disc will be described hereinafter.

The structure of the recording film is well-known in the prior art. Typically, there are a four-layer structure such as AlN/GdTbFe/AlN/Al or AlN/DyFeCo/AlN/Al or a three-layer structure such as SiN/TbFeCo/SiN or SiAlON/TbFeCo/SiAlON. The film thickness thereof is normally 150 to 300 nm. Although the recording film is formed on the whole surface of the plastics substrate, it may be formed partially thereon.

The protective film mainly protects the recording film, which may be formed of acrylic urethane UV curing resin, polyvinylidene chloride resin, poly-trifluoride polyethylene chloride resin or the like. The film is formed by applying those. Its film thickness is normally 2 to 20 μm.

The film for preventing moisture transmission may be formed of an inorganic material such as AlN, SiN, ZnS, $Al_2O_3$, $SiO_2$, SiAiOH or an organic material such as polyvinylidene chloride resin or poly-trifluoride ethylene resin. Among them, AlN is especially preferable. A thickness of that film varies with the material. Generally, the thickness of the film formed of the inorganic material ranges from 1 to 300 nm, preferable 1 to 200 nm. Alternatively, the thickness of the film formed of the organic material ranges from 2 to 20 μm, preferably 2 to 15 μm. For example, in a case of AlN, it preferably ranges from 1 to 20 nm. Within the above range of the film thickness, transient warp can be prevented and also an interference band of the optical disc can be prevented.

The antistatic resin film mixed with the electro-conductive filler containing the transparent electro-conductive filler prevents dust from being attached onto the surface of the optical disc and also prevents a damage from being generated, and it is preferable that its hardness is high and its surface resistivity is relatively low. The hardness is preferably pencil hardness of HB or more. In addition, the surface resistivity is preferably approximately $10^{13}\Omega$ or less. The antistatic resin film mixed with the electro-conductive filler can be formed by mixing a synthetic resin or its raw material with the transparent electro-conductive filler in a predetermined ratio and, if necessary, adding an inorganic filler a little to improve the hardness, and then they are applied on the substrate. As the synthetic resin, for example, acrylic urethane UV curing resin, acrylic UV curing resin or the like is used. The film is formed onto the substrate by, for example a spin coating method, a roll coating method, a dip coating method or the like and cured by means such as UV ray irradiation, heating or cooling, depending on the synthetic resin to be used. The film thickness is preferably 1 to 20 μm The transparent electro-conductive filler preferably comprises tin oxide doped with phosphorous because light transmission properties and stability can be provided at the same time. In addition, doping of phosphorous, such as phosphoric acid or sodium phosphate, to the tin oxide is performed by coreciprocitation and sintering from a liquid phase. A doping amount into the tin oxide is preferably 3 to 7 wt % of the whole amount of the electro-conductive filler. It is preferable that the content of the electro-conductive filler in the antistatic resin film is about 10 to 60, more preferably about 25 to 45 wt % and/or the average particle diameter thereof is 0.15 μm or less.

Although the optical disc according to the present invention is typically a photomagnetic disc, it may be a compact disc, a write once type disc and a photochromic type disc using a photochromic material as the recording film.

EXAMPLE

Example 1

Figure 5:
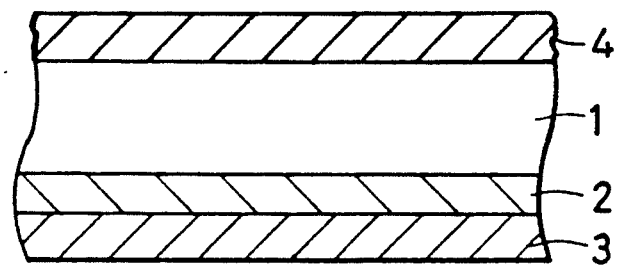
FIG. 5 is a view showing a structure of an optical disc according to an embodiment of the invention.

FIG. 5 is a view showing a structure of an optical disc according to an example 1 of the present invention. Referring to FIG. 5, reference numeral 1 designates a plastics substrate, reference numeral 2 designates a recording film, reference numeral 3 designates a protective film, reference numeral 4 designates an antistatic resin film mixed an electro-conductive filler.

In FIG. 5, the plastics substrate 1 is formed of polycarbonate and has a thickness of 1.2 mm and light transmission properties. The photomagnetic recording film 2 is formed on one surface of the plastics substrate 1. The recording film 2 has a four-layer structure of AlN/DyFeCo/AlN/Al. The protective film 3 is formed on the surface of the recording film 2. The protective film 3 is formed by applying an acrylic urethane UV curing resin by approximately 10 μm.

The antistatic resin film mixed an electro-conductive filler 4 is formed on the other surface of the plastics substrate 1.

The antistatic resin film 4 according to the present invention is made by dispersing the electro-conductive filler into the UV curing resin. First, when the filler mixed resin is 100, phosphorous and tin oxide are dispersed and mixed at the ratio of approximately 2.25 and 42.75 with a solvent by roll milling. While they are mixed, the UV curing resin is added to be jellied. Then, a film having a thickness of approximately 2.5 μm is formed from the above jellied material by a spinner. The average particle diameter of the filler is approximately 0.12 μm.

Stability and light transmission properties of the optical disc substrate formed of tin oxide doped with phosphorous are shown in the following table 1. The surface resistivity is employed as an index of stability. More specifically, the lower the surface resistivity is, the higher the stability is.

TABLE 1

| | Stability | Light Transmission (%) |
|---|---|---|
| Tin Oxide doped with Phosphorous | $8 \times 10^9 \Omega$ | 90.0 |

Comparative Example

Stability and light transmission properties of the optical disc substrates formed of tin oxide only and formed of tin oxide doped with antimony are shown in the following table 2.

The method for forming the antistatic resin film is the same as in the example 1 and the ratio of antimony and tin oxide to the resin is 2.25 and 42.75 when antimony is doped( shown in bottom column of Table 2).

TABLE 2

|  | Stability | Light Transmission (%) |
|---|---|---|
| Tin Oxide | $7 \times 10^{12} \Omega$ | 90.8 |
| Tin Oxide doped with Antimony | $4 \times 10^{8} \Omega$ | 87.0 |

As can be seen from the above tables, it is found that only the optical disc substrate in which the electro-conductive filler formed of tin oxide doped with phosphorus is used in the antistatic resin film has both high stability and light transmission properties.

EXAMPLE 2

The ratio of tin oxide to phosphorous in the electro-conductive filler is changed to 95 to 5 (constant) and then the content in the resin is studied. The method for forming the optical disc is the same as in the example 1.

FIG. 1 is a graph showing a relation between the content of the electro-conductive filler and surface flatness. The axis of abscissa in the graph shows weight percentage of the electro-conductive filler to the antistatic resin film, and the axis of ordinate therein shows a value of surface roughness measured by a terrain step method. The more the content of the electro-conductive filler is, the lower the surface flatness is. When the content is 45 wt % or more, the surface roughness exceeds 0.08 μm. As the surface roughness is increased, the light transmission properties are lowered because light scatters, causing a recording and reproducing signals to be degraded Especially, when the surface roughness is 0.08 μn or more, a decreasing rate of reflectivity exceeds 5%, which degrades signal quality. Therefore, in order to obtain sufficient light transmission properties as the optical disc, the content of the electro-conductive filler has to be 45 wt % or less as shown in FIG. 1.

Figure 2:
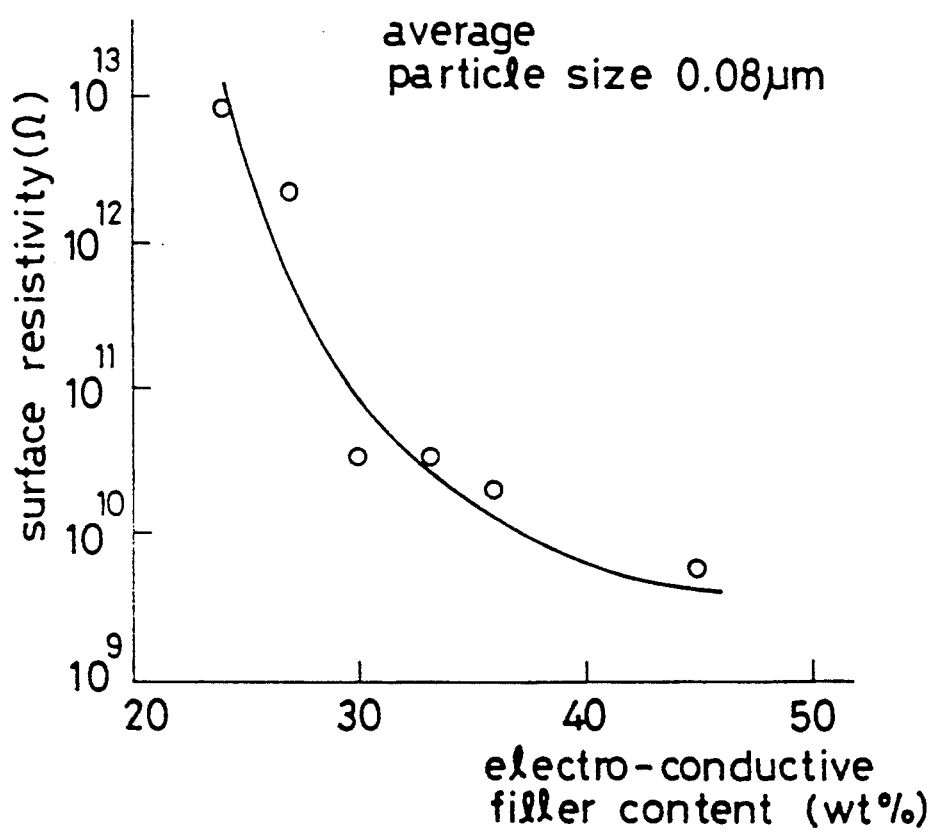
FIG. 2 is a graph showing a relation between the content of the electro-conductive filler to be employed in the invention and surface resistivity.

FIG. 2 is a graph showing a relation between the content of the electro-conductive filler in the antistatic resin film mixed an electro-conductive filler and surface resistivity thereof. As the content rate of the electro-conductive filler is lowered, the surface resistivity is increased and when the content is 25 wt % or less, the surface resistivity exceeds $10^{13} \Omega$. According to a dust attachment test, when the surface resistivity is $10^{13} \Omega$ or less, an effect of preventing attachment of dust is produced. More specifically, when the surface resistivity is $10^{13} \Omega$ or less, a sufficient antistatic performance as the optical disc can be provided. Therefore, as can be seen from FIG. 2, in order to obtain sufficient antistatic performance, the content of the electro-conductive filler has to 25 wt % or more.

Thus, the effective content of the electro-conductive filler ranges from 25 to 45 wt %.

EXAMPLE 3

The ratio of tin oxide to phosphorous in the electro-conductive filler is changed to 95 to 5 (constant) and then the average particle diameter in the resin is studied. The method for forming the optical disc is the same as in the example 1.

Figure 3:
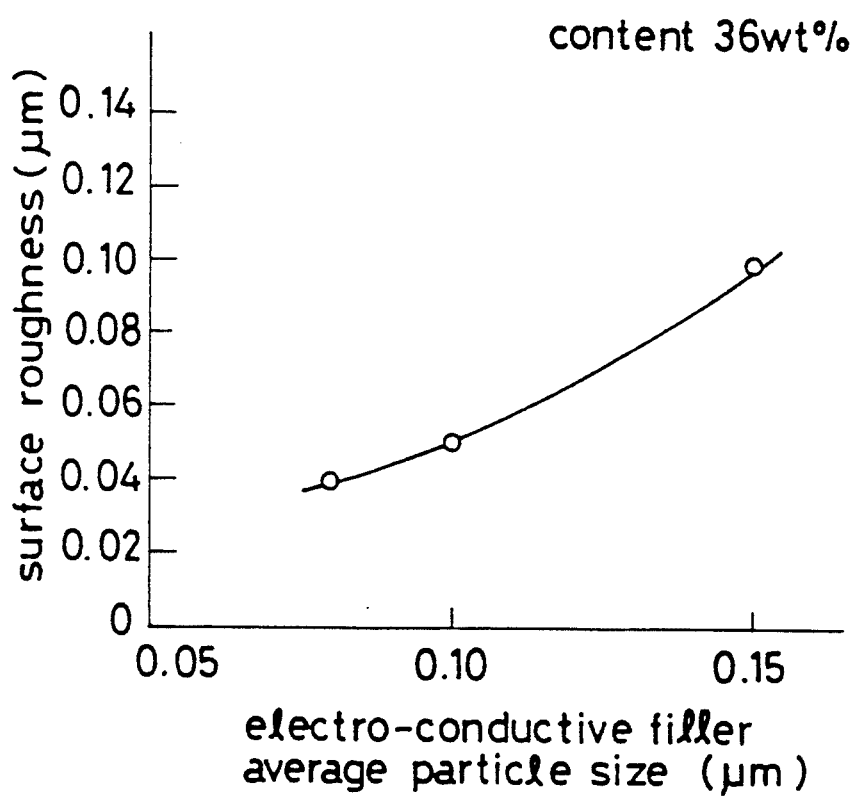
FIG. 3 is a graph showing a relation between an average particle diameter of the electro-conductive filler to be employed in the invention and surface flatness.
Figure 4:
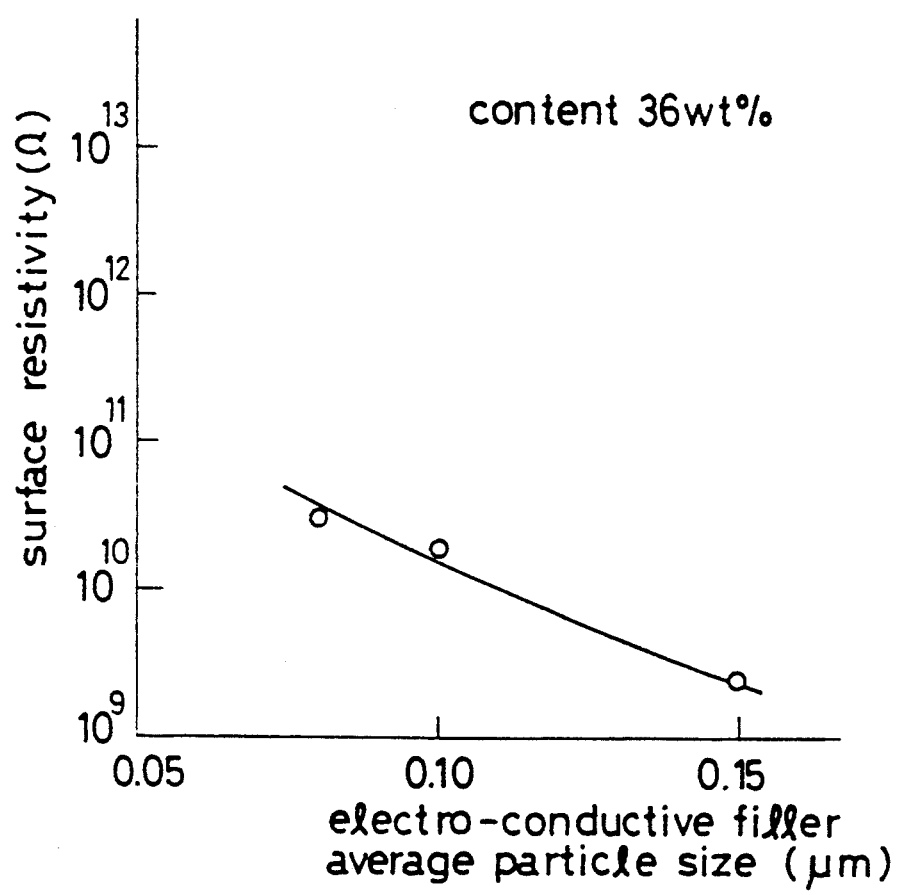
FIG. 4 is a graph showing a relation between the average particle diameter of the electro-conductive filler to be employed in the invention and the surface resistivity.

FIG. 3 is a graph showing a relation between the average particle diameter of the electro-conductive filler and surface flatness. As the average particle diameter of the electro-conductive filler is increased, the surface roughness is increased. When the average particle diameter is 0.15 μm or more, the surface roughness exceeds 0.08 μm. As described in the example 2, in order to obtain sufficient light transmission properties, the average particle diameter of the electro-conductive filler has to be 0.15 μm or less FIG. 4 is a graph showing a relation between the average particle diameter of the electro-conductive filler in the antistatic resin film mixed an electro-conductive filler and surface resistivity thereof. As the average particle diameter is decreased, the surface resistivity is gradually increased but its variation is small, that is, the surface resistivity is $10^{12} \Omega$ or less, which is within a range that the sufficient antistatic performance as the optical disc can be obtained.

Thus, the effective average particle diameter of the electro-conductive filler is preferably 0.15 μm or less As a result, it is preferable that the content of the electro-conductive filler ranges from 25 to 45 wt % and the average particle diameter thereof is 0.15 μm or less.

EXAMPLE 4

In the examples 4, 5 and 6, the effects of tin oxide doped with phosphorous in the optical disc having different structures are disclosed.

In the example 4 an optical disc having the same structure shown in the example 1 is used. Although the manufacturing method is the same, the antistatic resin film is approximately 2 82 m in thickness, the average particle diameter of the filler is approximately 0.10 μm and the ratio of phosphorous to tin oxide is approximately 1.5 to 28.5 when it is assumed that the resin is 100.

EXAMPLE 5

Figure 6:
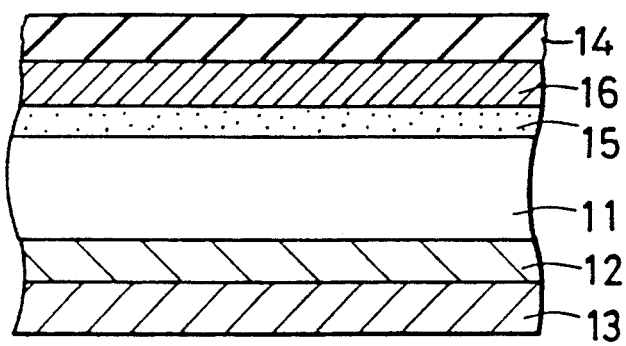
FIG. 6 is a view showing a structure of an optical disc according to another embodiment of the invention.

FIG. 6 is a view showing a structure of the optical disc according to the example 5 of the present invention. Referring to FIG. 6, reference numeral 11 designates a plastics substrate, reference numeral 12 designates a storing film, reference numeral 13 designates a protective film, reference numeral 14 designates an electrically-conductive filler mixed resin antistatic film, reference numeral 15 designates a film for preventing moisture transmission, and reference numeral 16 designates a protective film.

In FIG. 6, the plastics substrate, the storing film, the protective film, the antistatic resin film mixed an electroconductive filler are the same as in the example 2, and the film 15 for preventing moisture transmission is formed of AlN with a thickness of approximately 50 nm by sputtering. In addition, the protective film 16 is the same as the protective film 13, which is formed by applying an acrylic urethane UV curing resin with a thickness of approximately 5 to 10 μm.

The antistatic resin film mixed an electro-conductive filler 14 in the example 5 is formed by the same method in the example 4.

EXAMPLE 6

Figure 7:
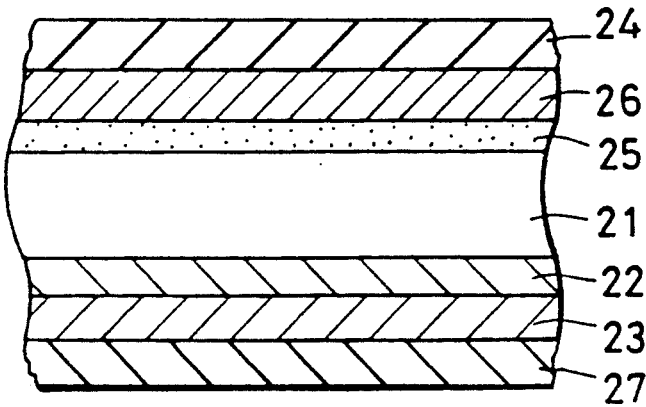
FIG. 7 is a view showing a structure of an optical disc according to still another embodiment of the invention.

FIG. V is a view showing a structure of the optical disc according to the example 6 of the present invention. Referring to FIG. 7, reference numeral 21 designates a plastics substrate, reference numeral 22 designates a recording film, reference numeral 23 designates a protective film, reference numeral 24 designates an antistatic resin film mixed an electro-conductive filler, reference numeral 25 designates a film for preventing moisture transmission, reference numeral 26 designates a protective film, and reference numeral 27 designates an antistatic resin film mixed an electro-conductive filler.

In FIG. 6, the plastics substrate, the recording film, the protective film, the antistatic resin film mixed an electro-conductive filler are the same as in the example 4, and the film 25 for preventing moisture transmission is formed of AlN with a thickness of approximately 50 nm by sputtering. In addition, the protective film 26 has the same thickness as that of the protective film 23, which is formed by applying an acrylic urethane UV curing resin with a thickness of approximately 5 to 10 $\mu$m. In addition, the antistatic resin film mixed an electro-conductive fillers 24 and 27 have the same thickness (approximately 2 $\mu$m).

The antistatic resin film mixed an electro-conductive fillers 24 and 27 in the example 6 are formed by the same method as in the example 4.

It is found that stability, light transmission properties, surface roughness and surface resistivity of the thus formed optical discs according to the examples 4, 5 and 6 each show preferable result.

Furthermore, it is found that warp of each of the substrates in the optical discs according to the examples 5 and 6 shows better result than that in the example 4.

As described above, according to the present invention, there can be provided the optical disc having preferable light transmission properties, surface flatness and antistatic performance, and also having preferable long-term stability and surface hardness by using the electro-conductive filler mixed antistatic film and limiting the kind, the content and the average particle diameter of the electro-conductive filler therein. In addition, shelf life and reproducibility before the electro-conductive filler is applied are high.

While only certain presently preferred embodiments have been described in detail, as will be apparent with those skilled in the art, certain changes and modifications can be made without departing from the scope of the invention as defined by the following claims.

What is claimed is:

1. An optical disc comprising a plastic substrate upon which an antistatic film of light transmission properties is formed of a synthetic resin, the antistatic film including a tin oxide with a phosphorus as electro-conductive filler and being provided on a side of the plastic substrate of the optical disc opposite the side where an optical beam is applied.

2. An optical disc according to claim 1, wherein a doping amount of phosphorus to tin oxide in the electro-conductive filler is 3 to 7 wt % of the whole amount of the electro-conductive filler.

3. An optical disc according to claim 1, wherein the content of the electro-conductive filler in the antistatic film ranges from 25 to 45 wt %.

4. An optical disc according to claim 1, wherein the electro-conductive filler in the antistatic film has an average particle diameter of 0.15 $\mu$m or less.

5. An optical disc according to claim 1, wherein the electro-conductive filler in the antistatic film has an average particle diameter of 0.15 $\mu$m or less and the content of said filler in the antistatic film ranges from 25 to 45 wt %.

* * * * *